United States Patent [19]

Stanger et al.

[11] 3,710,640
[45] Jan. 16, 1973

[54] WORM GEARS
[75] Inventors: Donald Arthur Stanger; Frank Yates, both of Durham; Jack Senior, Northumberland, all of England
[73] Assignee: R. W. Transmissions Limited, Hebburn, Durham County, England
[22] Filed: Feb. 8, 1971
[21] Appl. No.: 113,444

[52] U.S. Cl. ..................................................74/425
[51] Int. Cl. .............................................F16h 1/16
[58] Field of Search ..............................74/458, 425

[56] References Cited

UNITED STATES PATENTS 2,935,886   5/1960   Wildhaber ..........................74/458
3,292,447  12/1966   Zak .....................................74/458

Primary Examiner—Leonard H. Gerin
Attorney—Larson, Taylor & Hinds

[57] ABSTRACT

A double enveloping worm gear is made with an involute profile for the worm thread and worm wheel teeth, equal radii for the mean enveloping arc of the worm waist and the worm wheel pitch circle and the adjacent generatrix of the enveloping cylinder of the worm tangential to the worm wheel base circle; the contact area of the mating surfaces of the worm thread and the worm wheel teeth is thereby increased in comparison with a conventional worm gear of the same size.

1 Claim, 3 Drawing Figures

WORM GEARS

DESCRIPTION

This invention relates to worm gears and its primary object is to provide a worm gear in which the contact area of the mating surfaces of the worm thread and the worm wheel teeth is increased in comparison with a conventional worm gear of the same size.

With such an increased contact area, the load per unit area is reduced for a given load and the maximum load capacity, for a given size of gear, is increased.

There have been proposals for worm gears with increased contact area, including so-called hourglass or enveloping worm gears, both single and double enveloping gears, and various forms of tooth profile, including involute or part-circular profiles.

The present invention utilizes the two separately known features of double enveloping worm gears and involute tooth profiles in combination with new features to provide an improved gear.

According to the present invention, a double enveloping worm gear comprises, in combination, a waisted worm having a thread of involute profile and a meshing worm wheel having throated teeth of conforming involute profile, the radius of the mean enveloping arc of the waist of the worm being equal to the pitch circle radius of the worm wheel and the adjacent generatrix of the enveloping cylinder of the worm being tangential to the base circle of the worm wheel.

Figure 1:
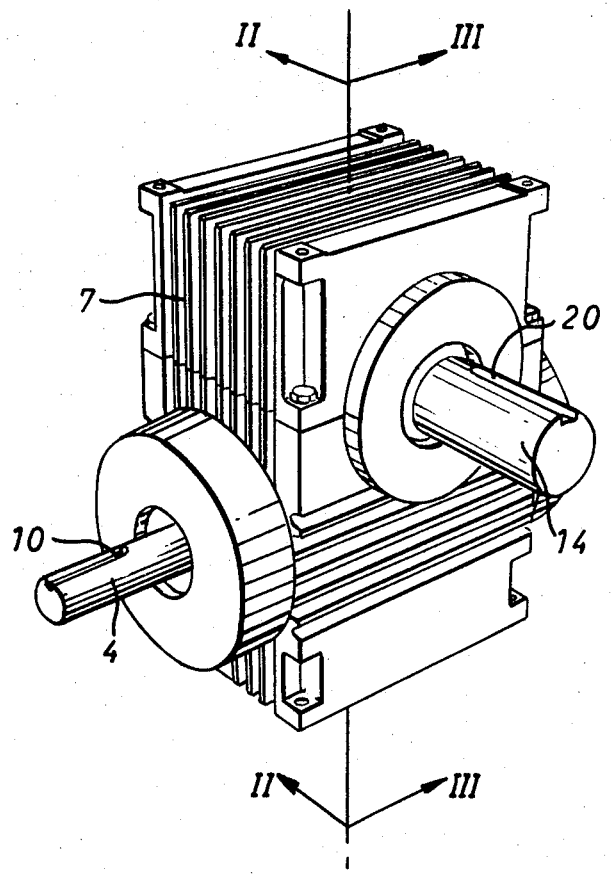
Figure 2:
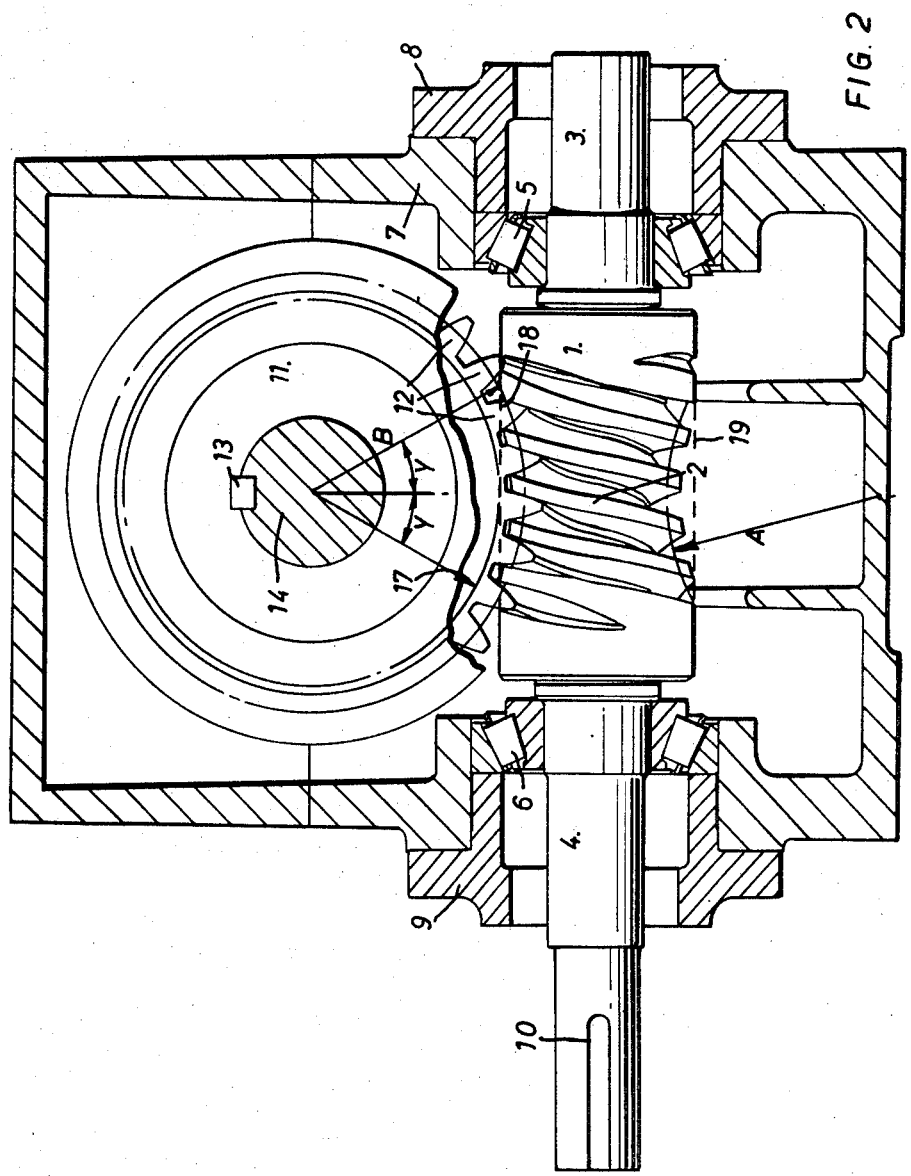
Figure 3:
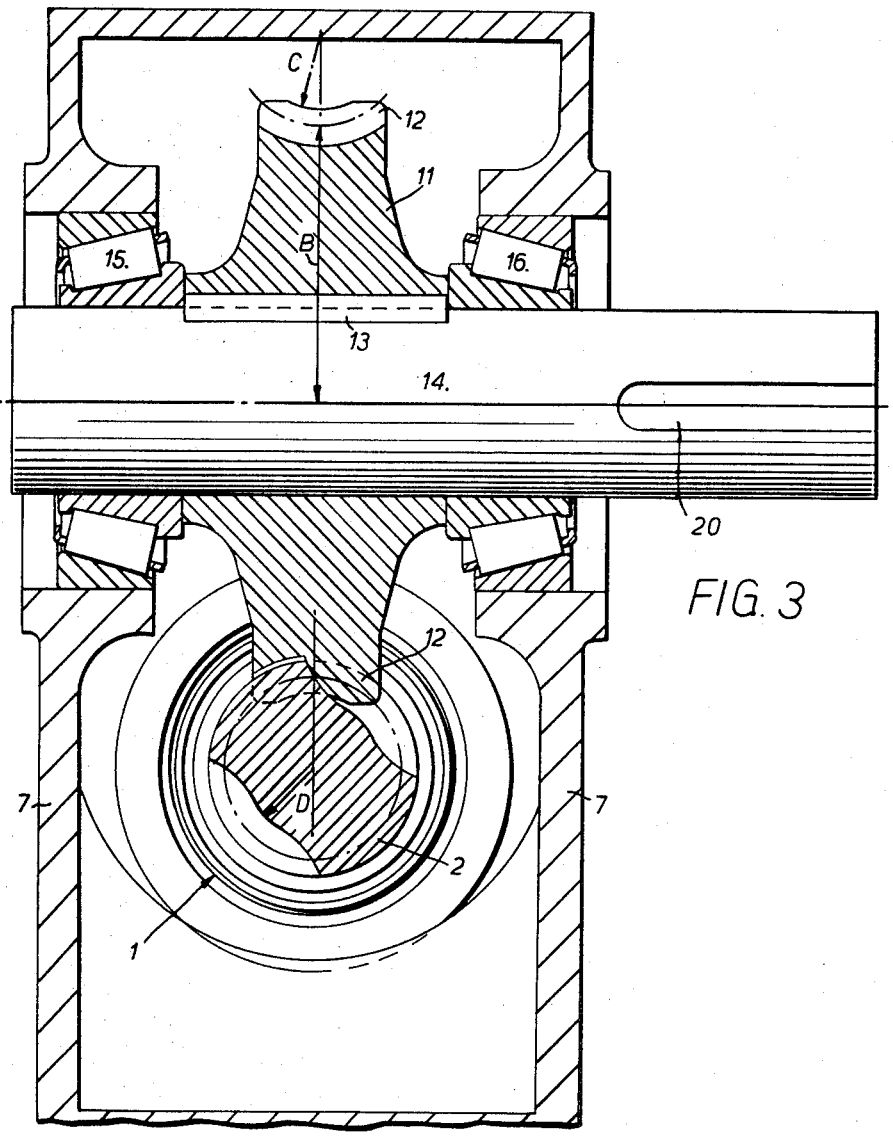

The invention will be more fully described with reference, by way of example, to the accompanying drawings, in which:

FIG. 1 is a perspective view of a worm gear according to the invention, in its housing, to show the relationship of the worm and worm wheel shafts, FIG. 2 is a section on the line II—II of FIG. 1, and FIG. 3 is a section on the line III—III of FIG. 1.

As shown by the drawings, the worm gear comprises a waisted worm 1 having a two-start helical thread 2 of involute profile. The worm 1 has stub shafts 3 and 4 journalled in tapered roller bearings 5 and 6 respectively which are held in a housing 7 by threaded end caps 8 and 9. Stub shaft 4 has a key-way 10 to enable a suitable drive (not shown) to be attached.

A meshing worm wheel 11 having throated teeth 12, of involute profile to conform with the profile of the thread 2, is locked by a key 13 on a shaft 14 whose axis of rotation is at right angles to the axis of rotation of the worm 1. The shaft 14 is also journalled in tapered roller bearings 15 and 16 carried by the housing 7 and one end of the shaft 14 is provided with a key-way 20.

The radius of the mean enveloping arc $A$ of the waist of the worm 1 is equal to the pitch circle radius $B$ of the worm wheel 11 to permit the maximum number of the teeth 12 to come into contact with the thread 2. For a worm thread 2 having a transverse pressure angle $Y$ and and a worm wheel having $T$ teeth 12, the number of teeth enveloped by the worm waist and in contact with the worm thread is given by $YT/$ . In the embodiment shown, $Y = 0.491$ radians and $T = 32$, therefore five teeth are in contact with the thread.

The adjacent generatrix 18 of the enveloping cylinder 19 of the worm 1 is tangential to the base circle 17 of the worm wheel 11 so that the fullest depth of mesh between teeth and thread is obtained. This feature also enables the teeth to mesh with the thread without interference.

The radius of curvature $C$ of the throat of the worm wheel teeth 12 is greater than the root radius $D$ of the worm 1 to avoid interference between the teeth and the thread.

The contact between the worm thread 2 and the worm wheel teeth 12 is double enveloping, one envelope, due to the throated teeth 12, being in the direction of the axis of rotation of the worm 1 and the second envelope, due to the waist of the worm 1, being in the direction of the axis of rotation of the worm wheel 11, and thus a mating area of contact, as distinct from only line contact, between teeth and thread is obtained. The features of involute tooth and thread profiles, equal radii of waist and pitch circle and tangential generatrix to the base circle all increase the mating area of contact. Thus the worm gear can transmit greater power than a conventional worm gear of the same size by a factor which, with suitable design and materials, may be as much as 10:1.

The gear will of course run in a bath of lubricant in the housing 7 and, for high transmitted loads, the lubricant should be selected to withstand temperatures somewhat higher than those usual for conventional gears. An incidental advantage of the matching involute profile of the thread and teeth is that they can be designed for rolling contact with a substantially constant lubricant-film clearance which avoids the need for a high surface finish.

The worm wheel is generated from a hob having the same configuration as the worm to ensure that the pitch circle radius $B$ of the worm wheel 11 is equal to the radius of mean enveloping arc of the worm waist and that the profile of the worm wheel teeth 12 conform with the involute profile of the worm thread 2.

In the embodiment shown, the worm 1 has a two-start thread 2 but the invention is equally applicable to single or multiple-start threads.

WE claim:

1. A double enveloping worm gear comprising, in combination, a waisted worm having a thread of involute profile and a meshing worm wheel generated from a hob having the same configuration as the worm so that the pitch circle radius of the worm wheel is essentially equal to the radius of the mean enveloping arc of the waist of the worm and the worm thread and worm wheel teeth have a conjugate involute profile with a common base circle, the adjacent generatrix of the enveloping cylinder of the worm being set, in the combination, so that said generatrix is tangential to the base circle of the worm wheel.

* * * * *